(No Model.)

F. PETSCH.
WORK HOLDER FOR CLAMPING DEVICES.

No. 494,722. Patented Apr. 4, 1893.

Witnesses:-
D. H. Haykrod
C. Sundgren

Inventor:-
Frank Petsch
by attorneys
Brown & Seward

UNITED STATES PATENT OFFICE.

FRANK PETSCH, OF NEWARK, NEW JERSEY, ASSIGNOR TO BINSSE & HAUSCHILD, OF SAME PLACE.

WORK-HOLDER FOR CLAMPING DEVICES.

SPECIFICATION forming part of Letters Patent No. 494,722, dated April 4, 1893.

Application filed October 31, 1892. Serial No. 450,531. (No model.)

*To all whom it may concern:*

Be it known that I, FRANK PETSCH, of Newark, in the county of Essex and State of New Jersey, have invented a new and useful Improvement in Work-Holders for Clamping Devices, of which the following is a specification.

My invention relates to an improvement in work holders for clamping devices in which a pair of holding jaws is united by one or more flexible strips of suitable spring material.

A practical embodiment of my invention is represented in the accompanying drawings, in which—

Figure 1:
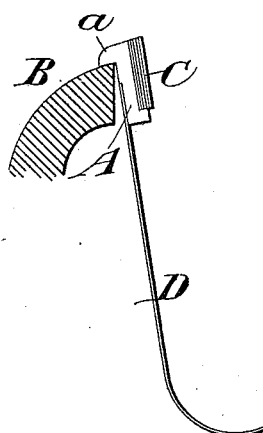
Figure 2:
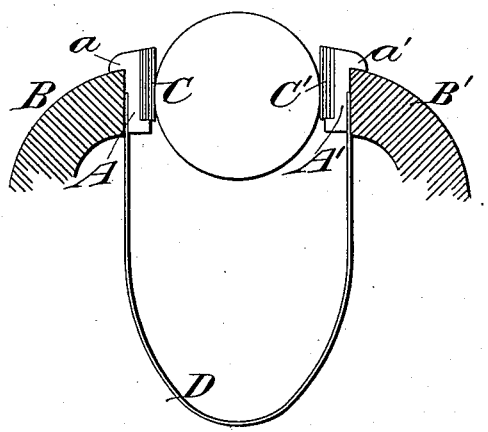
Figure 3:
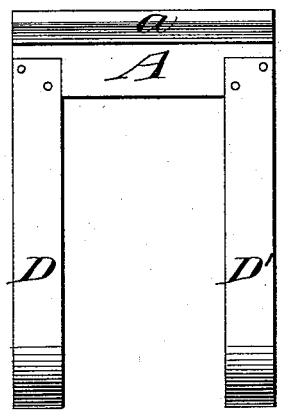

Figure 1 represents the holder as it appears in connection with the jaws of a vise when the latter are open to receive a piece of work. Fig. 2 represents the position of the holder with respect to a piece of round work when the jaws of the vise have been forced toward each other to clamp the work, and Fig. 3 is a view of the holder in side elevation.

The particular form of holder which I have selected for the purpose of illustrating my invention is that adapted to use in connection with the jaws of an ordinary vise, and the number of flexible strips employed for uniting the jaws is here shown as two, one at each end of the jaws. While I prefer this number of connections and their arrangement substantially as shown herein, it is obvious that one flexible connection centrally located might be employed and also that three or more such connections might be employed if so desired.

The jaws of the work holding device are represented respectively by A and A'; they are each provided on their upper outer edges with outwardly projecting flanges a and a' for conveniently supporting the holding jaws in the proper vertical adjustment with relation to the vise jaws B, B'.

The bodies of the jaws A, A' may be formed of any suitable metal, such for example as iron or steel, but their holding faces, particularly where fine work is to be held, should be made of some material which is not liable to bruise or injure the held work. I find it desirable to employ for this purpose what is commonly termed "vulcanized fiber" and I have shown in connection with the jaws A, A' facings C, C' of such material.

The flexible strips which connect the two jaws are represented by D and D' and consist, in the present instance, of flat strips of spring steel bent into a general U-shaped form with their ends secured firmly to the opposite jaws. It is intended that the tension of the spring strips D, D' shall be such as to press the jaws A and A' normally away from each other so that as the jaws of the vise are opened, the work holding jaws will have a tendency to follow their opening movements and rest against their faces in position to receive the work between them. As the jaws of the vise are closed to clamp the work between the jaws of the holder, the flexible connections D and D' will spring outwardly into the position to permit the jaws A and A' to apply themselves squarely to the opposite sides of work to be held, as represented in Fig. 2. Such movement of the flexible spring connections will not exert any undue strain upon them as they will readily adapt themselves to any ordinary tilting of the jaws A and A' that may be required—either outwardly or inwardly—to adjust the jaws squrely to the sides of the work. There will therefore be no liability of breakage which so often happens in connection with rigid cast metal connections and, at the same time, the connections may be made very light, embodying in themselves the double function of holding the jaws A and A' in position relative to each other and exerting upon them a tendency to open.

What I claim is—

1. A pair of work holding jaws fitted to be received between the jaws of a vise, the said work holding jaws being united by one or more flexible strips of spring material, substantially as set forth.

2. A pair of work holding jaws provided with projections for supporting them between the faces of a pair of vise jaws, said holding jaws being united by one or more flexible strips of spring material, said uniting strips having a normal tendency to separate the jaws, substantially as set forth.

FRANK PETSCH.

Witnesses:
THOMAS C. PROVOST,
HENRY B. BINSSE.